(12) United States Patent
Nguyen et al.

(10) Patent No.: US 10,089,350 B2
(45) Date of Patent: Oct. 2, 2018

(54) PROACTIVE QUERY MIGRATION TO PREVENT FAILURES

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 844 days.

(21) Appl. No.: 14/528,591

(22) Filed: Oct. 30, 2014

(65) Prior Publication Data

US 2016/0125026 A1 May 5, 2016

(51) Int. Cl.
G06F 17/30 (2006.01)
(52) U.S. Cl.
CPC .. *G06F 17/30395* (2013.01); *G06F 17/30477* (2013.01); *G06F 17/30566* (2013.01)
(58) Field of Classification Search
None
See application file for complete search history.

(56) References Cited

U.S. PATENT DOCUMENTS

| | | | |
|---|---|---|---|
| 5,987,452 A | 11/1999 | Kung | |
| 7,152,073 B2 | 12/2006 | Gudbjartsson et al. | |
| 7,657,516 B2 | 2/2010 | Zaman et al. | |
| 7,664,795 B2 | 2/2010 | Balin et al. | |
| 7,680,771 B2 * | 3/2010 | Cialini | G06F 17/30306 |
| | | | 707/999.003 |
| 7,792,857 B1 | 9/2010 | Brette et al. | |
| 8,635,208 B2 | 1/2014 | Wolf | |
| 2004/0103088 A1 * | 5/2004 | Cragun | G06F 17/30545 |

FOREIGN PATENT DOCUMENTS

CN 101067823 B 6/2010

OTHER PUBLICATIONS

Migrating to IBM DB2 10 for z/OS-Proactive Rebind Strategies and Tooling; IBM Software, May 2012, 20 pages, retrieved from ftp://public.dhe.ibm.com/software/data/sw-library/db2/zos/Proactive_rebind_tooling_wp.pdf on Nov. 3, 2014.
Andreas Nolle, German Nemirovski, Elite: An Entailment based Federated Query Engine for Complete and Transparent Semantic Data Integration, 7 pages, retrieved from http://semanco-project.eu/index_htm_files/ELITE.pdfon Nov. 3, 2014.
Ray Hales Hylock, Beyond Relational: A Database Architecture and Federated Query Optimization in a Multi-Modal Healthcare Environment, 309 pages, University of Iowa, retrieved from http://ir.uiowa.edu/cgi/viewcontent.cgi?article=4655&context=etd on Nov. 3, 2014.

* cited by examiner

*Primary Examiner* — Jau-Shya Meng
(74) *Attorney, Agent, or Firm* — Haynes and Boone, LLP

(57) ABSTRACT

A method of processing a federated query includes receiving a first federated query from a first client and receiving a second federated query from a second client. The first federated query includes a first source query that is in accordance with a target data source's query model, and the second federated query includes a second source query. The method also includes sending the second source query to the target data source and determining whether the second source query has failed at the target data source. The method further includes in response to determining that the second source query has failed, migrating the second source query in accordance with the first source query.

19 Claims, 9 Drawing Sheets

502 →

| Query 504 | FID 506 | SID 508 | Total Successes 510 | Total Failures 512 | Date 514 | Inspection Count 516 |
|---|---|---|---|---|---|---|
| Select * from People_Info | 112 | 202, 204 | 0 | 5 | 13JAN2014 | 5 |
| Select * from People | | 202 | 0 | 5 | 13JAN2014 | 5 |
| Select * from Accounts | | 204 | 5 | 0 | | 5 |

520 — Inspection Count 516 column marker
522, 524 — row markers

503 →

| FID 506 | SID 508 | Clients 534 | Success 536 | Fail 538 | Fail Reason 540 |
|---|---|---|---|---|---|
| 112 | | 102 | 0 | 5 | |
| | 202 | 102 | 0 | 5 | SID 202 |
| | 204 | 102 | 5 | 0 | Invalid table name |

550, 552, 554 — row markers

FIG. 5B

PROACTIVE QUERY MIGRATION TO PREVENT FAILURES

FIELD OF DISCLOSURE

The present disclosure generally relates to a federated system, and more specifically to query migration to prevent breakdowns in a federated system.

BACKGROUND

A federated system is a collection of cooperating but autonomous data sources belonging to a federation. The autonomous data sources belonging to the federation cooperate with each other yet maintain some degree of autonomy. A federated system allows a client to send requests to multiple data sources with the use of a single federated query. A federated query is a query that contains several source queries, and each source query is specific to a data source. A source query that is specific to a data source is written in a format that is understandable by the data source and may be executable at the data source.

Today, data replication and failover are important properties of data sources and enterprise systems, and this is emphasized in data federation engines and service-oriented architectures. In a federated system, a federated server may receive a federated query from a client and send each source query embedded in the federated query to the appropriate data source for execution. When a client submits a federated query, the federated server may return a result of the federated query by retrieving results from the applicable data sources.

When a federated system federates many different data sources, a higher probability exists that some queries may fail due to data sources changing their query models. While conducting data federation, if a source query is sent to a data source that has updated its query model, this may introduce an immediate breakdown of the whole data federation scenario. For example, clients may continue submitting queries in the old format rather than submitting queries in the updated format to the data source. This breakdown may be manifested to clients in the form of query failure. Additionally, if even a single source query fails among many other source queries that were embedded in a federated query, the federated query as a whole may be rendered unusable. Accordingly, the federated server may be prevented from responding to the federated query because the result would have missing data that is stored at the data source that changed its query model.

A conventional approach to solving this problem of clients sending queries in the old format to data sources that have been updated involves automated testing. Using automated testing, the tests typically execute queries using the updated query models. This problem may be more pronounced in Platform-as-a-Service (PaaS) solutions, which usually have a wider range of clients for a data source.

A solution to this problem is quite complicated because data federation aims to work with large amounts of data. The solution to this problem becomes more complex as more autonomous data sources are added to the federation. Moreover, in the case of data federation, the data source is typically not under the control of the data federation architect, and the clients are typically not under direct control of the data source administrator.

BRIEF SUMMARY

It may be desirable to perform actions to prevent a federated query or a source query embedded in the federated query from failing. Methods, systems, and techniques for processing a federated query are provided.

According to an embodiment, an example method of processing a federated query includes receiving a first federated query from a first client. The first federated query includes a first source query that is in accordance with a target data source's query model. The method also includes receiving a second federated query from a second client. The second federated query includes a second source query. The method further includes sending the second source query to the target data source. The method also includes determining whether the second source query has failed at the target data source. The method further includes in response to determining that the second source query has failed, migrating the second source query in accordance with the first source query.

According to another embodiment, a system for processing a federated query includes a query statistics database that stores information about queries. The system also includes a query migrator that receives a first federated query from a first client and receives a second federated query from a second client. The first federated query includes a first source query that is in accordance with a target data source's query model, and the second federated query includes a second source query. The query migrator sends the second source query to the target data source, determines whether the second source query has failed at the target data source, and in response to determining that the second source query has failed, migrates the second source query in accordance with the first source query.

According to another embodiment, a non-transitory machine-readable medium including a plurality of machine-readable instructions that when executed by one or more processors is adapted to cause the one or more processors to perform a method including: receiving a first federated query from a first client, the first federated query including a first source query that is in accordance with a target data source's query model; receiving a second federated query from a second client, the second federated query including a second source query; sending the second source query to the target data source; determining whether the second source query has failed at the target data source; and in response to determining that the second source query has failed, migrating the second source query in accordance with the first source query.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIGS. 5A-5C illustrate example tables storing information about inspected queries, according to some embodiments.

DETAILED DESCRIPTION

Figure 1:
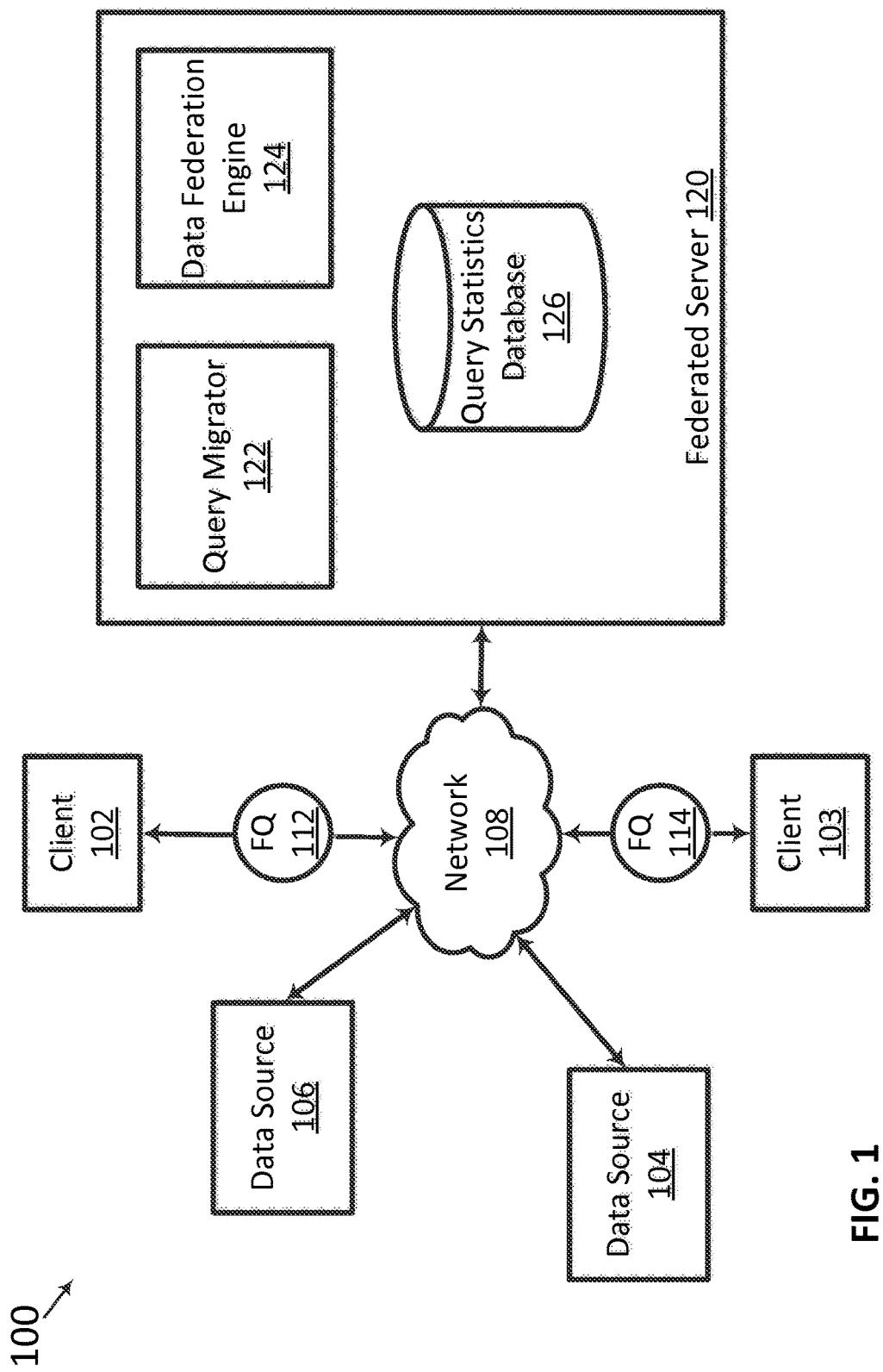
FIG. 1 is a block diagram illustrating a federated system for processing a federated query, according to some embodiments.

I. Overview
II. Example System Architecture
III. Query Processing
   A. Intercept Queries and Send to Data Federation Engine
     1. Collect Information about Queries
     2. Query Migration Based on Migration Time Interval
   B. Data Federation Engine Processes Queries and Retrieves Query Result Sets
     1. Migrate Query Based on Result Set from Data Federation Engine
     2. Do Not Migrate Query Based on Result Set from Data Federation Engine
     3. Example Collected Information Based on a Query in Accordance with a Data Source's Outdated Query Model
   C. Receive a Query in Accordance with a Data Source's Updated Query Model
IV. Example Methods
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A target data source may refer to a data source to which a query is to be sent. A federated query may include one or more embedded source queries. At the time of running a federated query, it may be desirable to ensure that the federated query as well as the one or more embedded source queries are likely to succeed and be executable at their target data sources. If one or more queries (e.g., federated query or source query) fails, the federated query as a whole may be rendered unusable.

A source of query failure may be that the structure of valid queries sent to the data source has changed. In an example, a data source's query model may be updated without all clients that send queries to the data source being aware of the data source's updated query model. An update to a data source's query model may be a nondestructive change in the data source that affects the structure of the data source (e.g., additions to or removal of one or more database tables from the data source or additions to or removal of one or more columns from a database table). An update to a data source's query model may also be a change in the format of the query that affects the validity of the query.

The present disclosure provides techniques to minimize query failure due to a data source's query model being updated and clients continuing to send queries in accordance with the data source's outdated query model. In an example, a column of a table stored in a data source might be removed such that the updated table only has three columns, and the data source's outdated query model may select data based on the removed column. In this example, the data source's updated query model should not specify the removed column or include a selection of data based on the removed column. In another example, the name of a table stored in a data source may be updated, and the data source's outdated query model may select data based on the outdated table name. In this example, the data source's updated query model should not specify the outdated table name or include a selection of data based on the outdated table name.

Some clients that send queries to the data source may receive updates to the data source's query model and thus change their queries in accordance with the data source's updated query model. Some other clients, however, may continue to send queries in accordance with the data source's outdated query model, which are invalid queries that will fail. The more clients that send queries to a federated server, the higher the chances are that the changes to the data source's query model will break a client's queries.

The present disclosure provides techniques to mitigate this failure. A query migrator may use the information in a query statistics database to determine whether to migrate a query. In an example, the query migrator queries the query statistics database to determine whether a particular query has failed or is likely to fail. If the particular query is likely to fail, the query migrator may migrate the query and submit the migrated query in place of the particular query for processing. From a client's perspective, the process of sending a query and receiving the result set of the query is transparent. Rather, the client sends a federated query to a federated server like the client would any other federated server and waits for the result set. The federated server performs processing to fix invalid queries.

Unless specifically stated otherwise, as apparent from the following discussion, it is appreciated that throughout the description, discussions utilizing terms such as "receiving", "determining", "migrating", "constructing," "updating," "replacing," "selecting," and "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a federated system 100 for processing a federated query, according to some embodiments. System 100 includes clients 102 and 103, data sources 104 and 106, and federated server 120 coupled via a network 108. Although two clients and two data sources are illustrated, this is not intended to be limiting, and system 100 may include one or more clients and/or one or more data sources.

Client 102, 103 may be a personal computer (PC), workstation, mobile device (e.g., a mobile phone, personal digital assistant (PDA), tablet, and laptop), game console, set-top box, kiosk, embedded system, or other device having at least one processor and memory. Client 102, 103 may also be an application run on a PC, server, database, etc. Additionally, client 102, 103 may be a fat client (e.g., a client that performs local processing and data storage), a thin client (e.g., a client that performs minimal or no local processing and minimal to no data storage), and/or a hybrid client (e.g., a client that performs local processing but little to no data storage).

Data sources 104 and 106 may be autonomous data sources that belong to a federation. The autonomous data sources may be external systems that store data accessible over network 108. In an example, data sources 104 and 106 are heterogeneous data sources that accept different query formats relative to each other. In an example, data source 104 is an ORACLE® database provided by ORACLE®, and data source 106 is a DB2® database provided by IBM®. Trademarks are the properties of their respective owners. In another example, data source 104 is an ORACLE® database, and data source 106 is a web service.

Network 108 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Federated server 120 may be a single machine or may include multiple interconnected machines (e.g., machines configured in a cluster). Client 102 may send a federated query 112 to federated server 120 for processing, and client 103 may send a federated query 113 to federated server 120 for processing. Federated query 112 includes one or more embedded source queries that may each be sent to one or more target data sources belonging to the federation for execution. Each of the source queries may be specific to an autonomous data source and may define one or more target data sources. Clients may submit a high-level federated query to federated server 120 for processing without knowing where the data responsive to the query actually resides (e.g., in data source 104 or data source 106).

Figure 2:
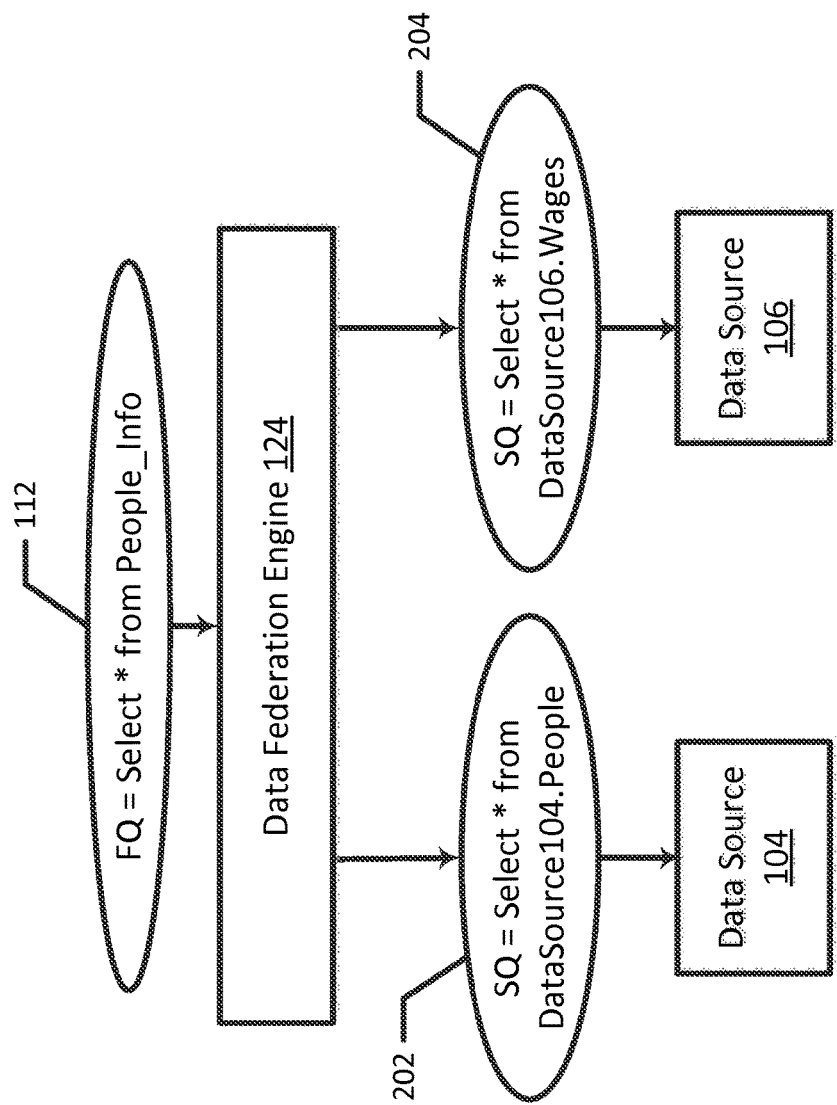
FIG. 2 is an example of a federated query, according to some embodiments.

FIG. 2 is an example of federated query 112, according to some embodiments. In the example illustrated in FIG. 2, federated query 112 is the query, "Select * from People_Info", which retrieves information about people in an organization (e.g., employees of the organization and their wages). Query proxy 122 may receive federated query 112 and pass federated query 112 along to data federation engine 124 to break federated query 112 down into source queries 202 and 204. Data federation engine 124 may break down federated query 112 into source queries 202 and 204 that are eventually submitted to target autonomous data sources for processing and execution.

Source query 202 is a query, "Select * from DataSource104.People", where "DataSource104" is a source of the table "People". In such an example, source query 202 is specific to data source 104, which stores at least a table "People" from which data is retrieved based on execution of source query 202 against data source 104. Source query 204 is a query, "Select * from DataSource106.Wages", where "DataSource106" is a source of the table "Wages". In such an example, source query 204 is specific to data source 106, which stores at least a table "Wages" from which data is retrieved based on execution of source query 204 against data source 106. In an example, source query 202 is not executable at data source 106, and source query 204 is not executable at data source 104.

Referring back to FIG. 1, federated server 120 includes a query migrator 122, data federation engine 124, and query statistics database 126. Each of query migrator 122, data federation engine 124, and query statistics database 126 may execute on a computing device having at least one processor and memory. Data federation engine 124 enables client 102, 103 to treat data sources belonging to the federation as one virtual database and access them with the use of a single federated query. In an example, federated query 112 is a federated join query. In this example, data federation engine 124 may provide a common view of many different data sources. A data view is a basic building block of data federation and may be used in the scope of one federated query.

III. Query Processing

Query migrator 122 may act as a query proxy and intercept federated queries sent from clients 102 and 103 and also intercept the result set of the queries sent back to the client. Additionally, query migrator 122 may inspect queries, collect information on queries (e.g., failed and successfully executed queries), and store the information in query statistics database 126. In some embodiments, query migrator 122 may use the information stored in query statistics database 126 to determine whether to migrate a query. In an example, data source 104's query model is updated and client 102 is unaware of the update. Accordingly, client 102 may send an invalid query in accordance with data source 104's outdated query model. Client 103, however, may be aware that data source 104's query model has been updated and may send a valid query in accordance with data source 104's updated query model. Query migrator 122 may note the failure and successes of these queries, and the next time client 102 sends the invalid query, query migrator 122 may migrate this invalid query and modify it such that it is in accordance with data source 104's updated query model, which was provided by client 103.

Figure 3:
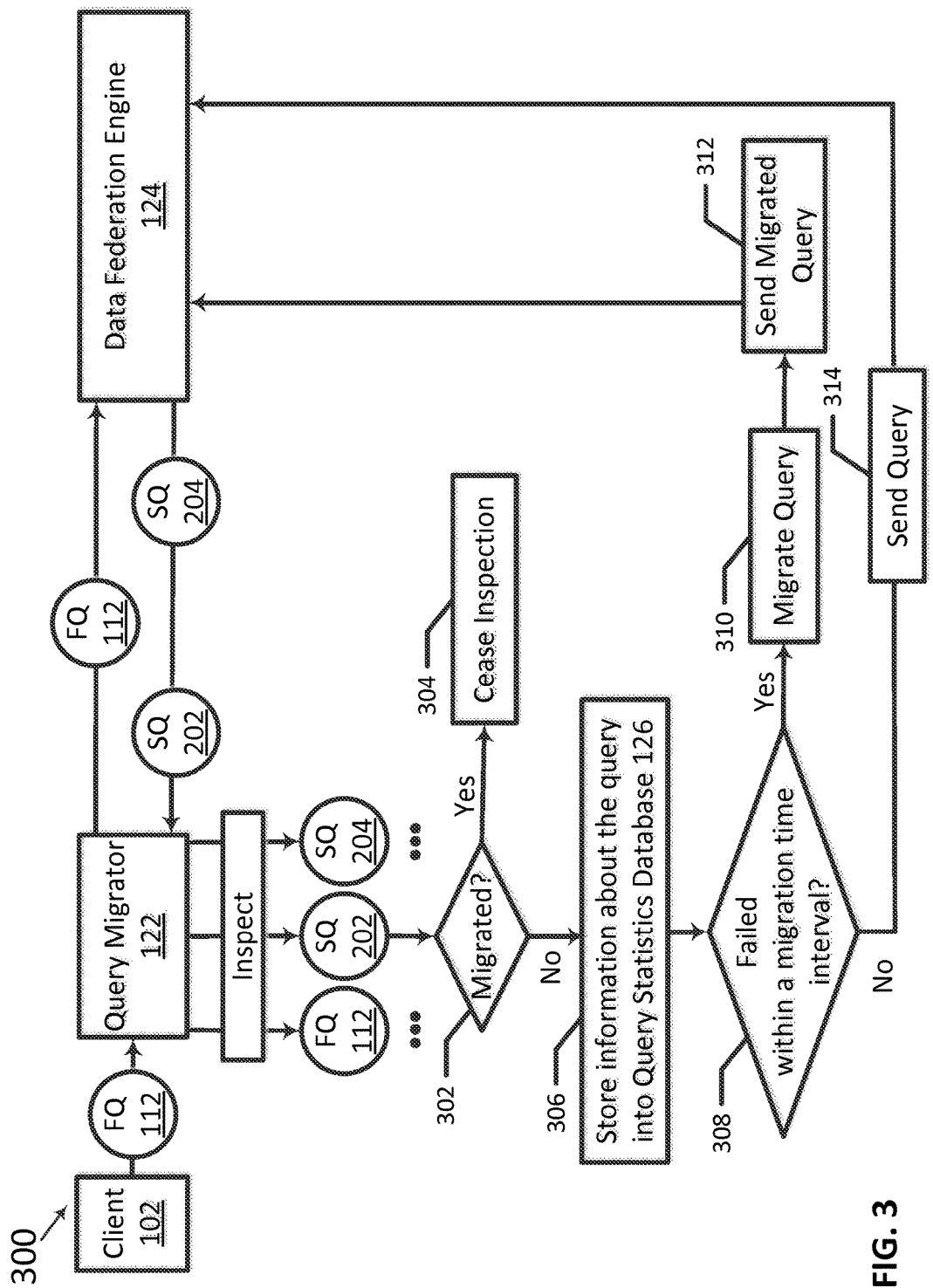
FIG. 3 is a block diagram illustrating a process flow for processing a federated query, according to some embodiments.
Figure 4:
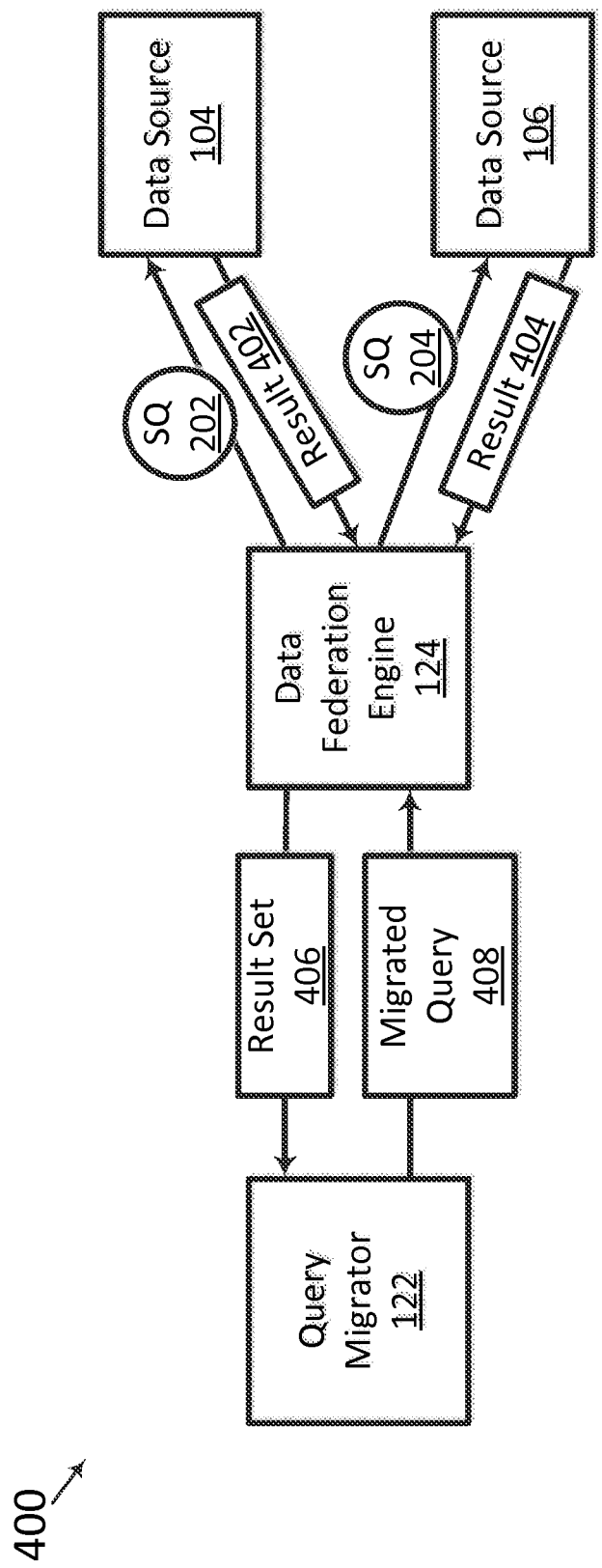
FIG. 4 is a block diagram illustrating a process flow for processing a federated query, according to some embodiments.
Figure 5A:
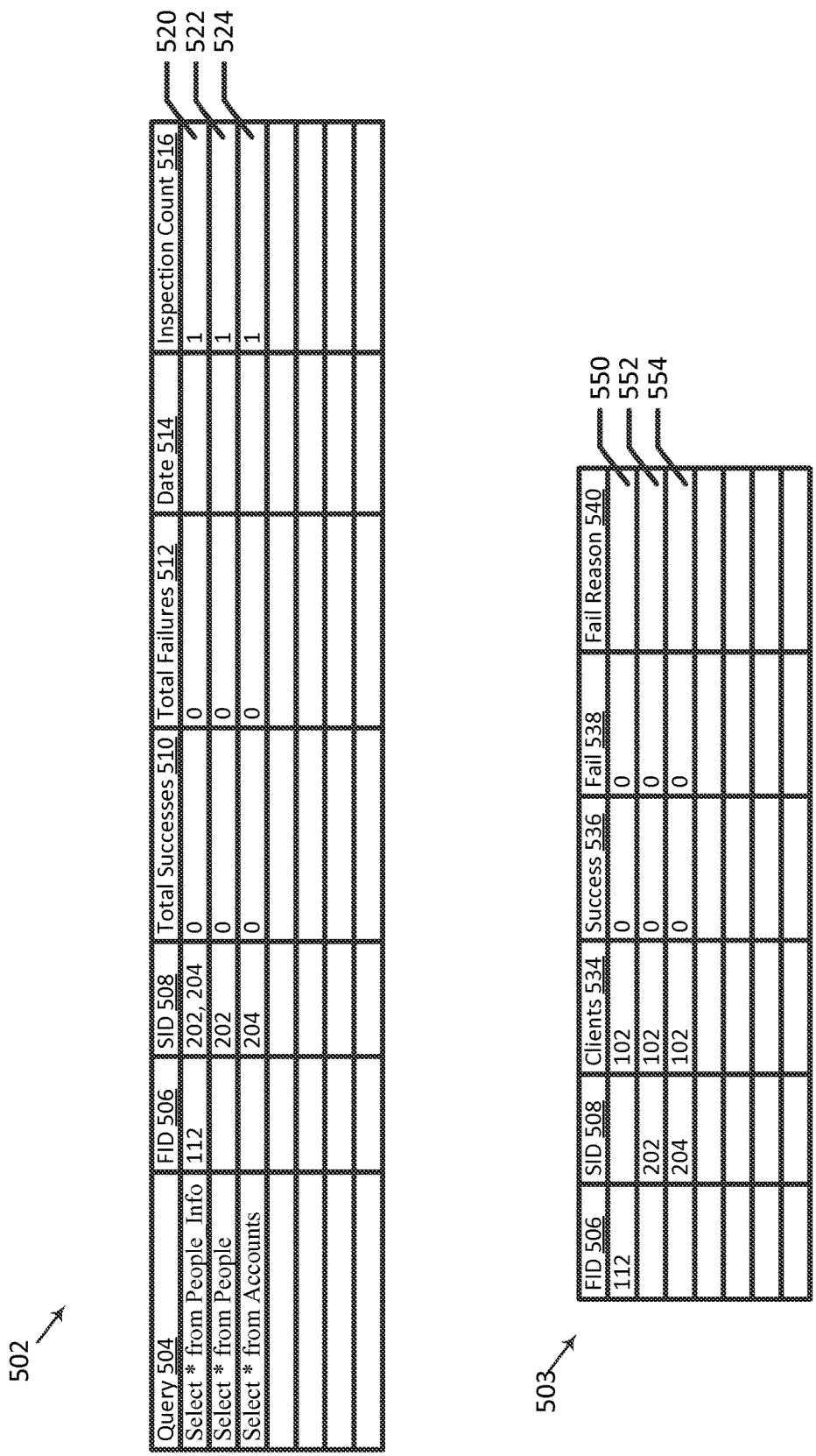
Figure 5C:
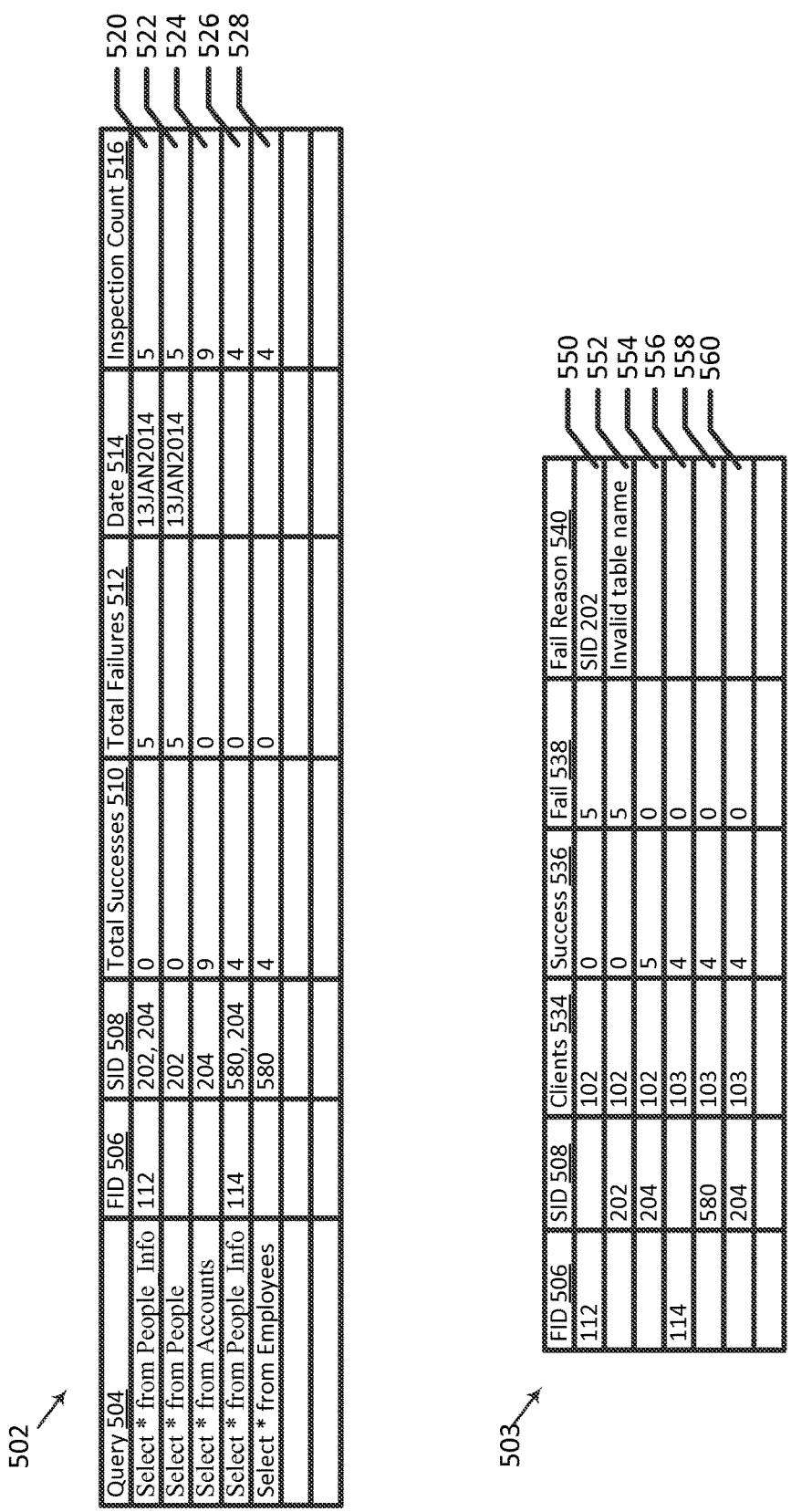

FIG. 3 is a block diagram illustrating a process flow 300 for processing a federated query, according to some embodiments. FIG. 4 is a block diagram illustrating a process flow 400 for processing a federated query, according to some embodiments. FIGS. 5A-5C illustrate example tables 502 and 503 storing information about queries inspected by query migrator 122, according to some embodiments. Table 502, 503 is stored in query statistics database 126, and the information stored in query statistics database 126 may be used by query migrator 122 to determine whether to migrate a query. Although the data structure storing the statistics is illustrated as being a table, this is not intended to be limiting and the data structure may be different from a table. Additionally, tables 502 and 503 may be stored in different databases. Tables 502 and 503 are not intended to be limiting, and query statistics database 126 may store tables with different information from that illustrated.

A. Intercept Queries and Send to Data Federation Engine

FIGS. 3, 4, and 5A-5C will be discussed in relation to each other to better explain how a query is processed to better prevent query failure. In FIG. 3, client 102 sends federated query 112 to federated server 120. Query migrator 122 may intercept and inspect federated query 112 and also send it to data federation engine 124 to break down into one or more source queries. Data federation engine 124 may identify a set of source queries embedded in federated query 112 and send the set of embedded source queries back to query migrator 122 for further processing. Query migrator 122 may inspect federated query 112 and each of the source queries embedded in the federated query. It should be understood that query migrator 122 may inspect these queries at any time relative to each other. For example, query migrator 122 may inspect the queries at different times and may also inspect one query after another query (e.g., federated query 112) has been sent to data federation engine 124.

Query migrator 122 may inspect each of the queries (e.g., federated query 112, source query 202, or source query 204), collect information (e.g., statistics) on the queries, and determine whether to migrate the inspected queries. If query migrator 122 migrates a query, query migrator 122 includes an indication in the query that it has been migrated. In an example, query migrator 122 inserts a migration comment into the query to indicate that the query has been migrated. In this example, query migrator 122 may insert the migration comment by setting a migration flag in the query.

The following is a description of query migrator 122 inspecting and storing information on source query 202. This description applies as well to any of the other queries that query migrator 122 inspects (e.g., federated query 112 or source query 204). At an action 302, it may be determined whether the query has been migrated. In an example, query migrator 122 determines whether the query has been migrated. At an action 304, if the query has been migrated then the inspection of the query ceases. In an example, query migrator 122 may cease inspecting the query if it includes an indication that the query has been migrated. If the query does not include an indication that the query has been migrated, actions 306 and 308 may be performed. At an action 306, information about the query may be stored in query statistics database 126. In an example, query migrator 122 may continue to inspect the query and store information about the query in query statistics database 126 if the query does not include an indication that the query has been migrated.

1. Collect Information about Queries

FIG. 5A illustrates example tables 502 and 503 storing information about queries inspected by query migrator 122, according to some embodiments. Before any information is collected about the queries, tables 502 and 503 may be empty. Table 502 includes a "Query" column 504 that stores the queries inspected by query migrator 122, a "FID" (federated query identifier) column 506 that stores an identifier of a query if the inspected query is a federated query, and a "SID" (source query identifier) column 508 that stores an identifier of a query if the inspected query is a source query or stores an identifier of the one or more source queries embedded in the federated query if the inspected query is a federated query. Table 502 also includes a "Total Successes" column 510 that keeps count of the number of times the inspected query has successfully executed, a "Total Failures" column 512 that keeps count of the number of times the inspected query has failed, a "Date" column 514 that stores the last date at which the inspected query failed, and an "Inspection Count" column 516 that keeps count of the number of times the query has been inspected.

Table 503 includes "FID" column 506, "SID" column 508, a "Client" column 534 that stores an identifier of the client that sent the inspected query, a "Success" column 536 that keeps count of the number of times the inspected query that was sent by the client successfully executed, a "Fail" column 538 that keeps count of the number of times the inspected query that was sent by the client failed, and a "Fail Reason" column 540 that indicates a reason that the inspected query failed. For example, query migrator 122 may add the inspected query into "Query" column 504 and increment a number of times the query has been inspected in "Inspection Count" column 516. In an example, query migrator 122 increments the inspection count when the query is received from the client and not from data federation engine 124. In another example, query migrator 122 increments the inspection count when the query is received from the client or from data federation engine 124.

As illustrated in FIG. 5A, query migrator 122 may store information about inspected federated query 112 into a first entry 520 of table 502. First entry 520 indicates that federated query 112 has a FID of "112," includes embedded source queries 202 and 204, has not yet been successfully executed, has not yet failed, and is being inspected for the first time. Additionally, query migrator 122 may store information about inspected source query 202 into a second entry 522 of table 502. Second entry 522 indicates that source query 202 has a SID of "202," has not yet been successfully executed, has not yet failed, and is being inspected for the first time. Additionally, query migrator 122 may store information about inspected source query 204 into a third entry 524 of table 502. Third entry 524 indicates that source query 204 has a SID of "204," has not yet been successfully executed, has not yet failed, and is being inspected for the first time.

Query migrator 122 may also store information about inspected federated query 112 into a first entry 550 of table 503. First entry 550 indicates that the query identified by FID "112" was sent by client 102, has not yet been successfully executed, and has not yet failed. Additionally, query migrator 122 may store information about inspected source query 202 into a second entry 552 of table 503. Second entry 552 indicates that the query identified by SID "202" was sent by client 102, has not yet been successfully executed, and has not yet failed. Additionally, query migrator 122 may store information about inspected source query 204 into a third entry 554 of table 503. Third entry 554 indicates that the query identified by SID "204" was sent by client 102, has not yet been successfully executed, and has not yet failed. The state of tables 502 and 503 in FIG. 3A indicate that statistics of a result set of federated query 112 and source queries 202 and 204 has not yet been stored in query statistics database 126.

2. Query Migration Based on Migration Time Interval

Referring back to FIG. 3, process flow proceeds from action 306 to action 308. At an action 308, it is determined whether the query has failed within a migration time interval. The migration time interval may be user configurable and may be, for example, two weeks. In an example, query migrator 122 determines whether the query has failed within a migration time interval.

If the query has failed within the migration time interval, actions 310 and 312 may be performed. At an action 310, the query is migrated. In an example, query migrator 122 migrates the query. At an action 312, the migrated query is sent to data federation engine 124 for further processing. In an example, query migrator 122 sends the migrated query to data federation engine 124 for further processing. In contrast, if the query has not failed within the migration time interval, process flow may proceed to action 314, in which the query is sent to data federation engine 124 for further processing. The state of tables 502 and 503 in FIG. 3A indicate that none of federated query 112 and source queries 202 and 204 has failed within a migration time interval. Thus, query migrator 122 sends these queries to data federation engine 124 for further processing.

In other words, if the date and/or time of the last failure of a query is older than the migration time interval, then query migrator 122 does not modify the query and continues its processing as usual. In contrast, if the date and/or time of the last failure of the query is not older than the migration time interval, then query migrator 122 may determine whether a migrator query is stored in query statistics database 126. A migrator query is a closest similar query to the failed query, which has a date or time of last failure that is not older than the migration time interval, and is a query that successfully executed. Query migrator 122 may use the migrator query rather than the failed query to retrieve a result set of the query.

B. Data Federation Engine Processes Queries and Retrieves Query Result Sets

Referring now to FIG. 4, data federation engine 124 receives federated query 112 and source queries 202 and 204 and identifies autonomous data sources to which to send the source queries embedded in federated query 112. Data federation engine 124 sends the source queries to their respective data sources and receives a result 402 in response to source query 202 from data source 104 and a result 404 in response to source query 204 from data source 106.

Data federation engine 124 may stream a complete result set 406 of federated query 112 back to client 102, where the complete result set 406 includes details from result sets 402 and 403. In an example, data federation engine 124 includes details in complete result set 406 of federated query 112 as to whether each source query failed or successfully executed. If a source query fails to execute, the federated query including the failed source query may also be said to fail to execute.

1. Migrate Query Based on Result Set from Data Federation Engine

Query migrator 122 may intercept the streamed result set 406 of federated query 112, collect statistics about the federated query and executed source queries, and store the statistics in query statistics database 126. In an example, when any errors occur, data federation engine 124 notifies query migrator 122 which query failed and with what error. In this example, query migrator 122 may search query statistics database 126 for a closest similar query to the failed query. Query migrator 122 may determine whether a query has failed and migrate the query in response to determining that the query has failed. The migrated query may be based on another source query received from a client different from the client that sent the failed query.

In an example, source query 202 may fail and query migrator 122 may construct a search query that is used to find the closest similar query to the failed source query. The search query may be a Structured Query Language (SQL) query that includes an expressions clause (e.g., columns from which or calculations that a client desires to retrieve), one or more tables (table from which the client desires to retrieve data), and a conditions clause (e.g., conditions that must be met for a database record to be selected). The search query may be of the form "SELECT Column1, Column2, . . . , Column X FROM Table1, Table2, . . . , TableY WHERE Condition1, Condition2, . . . , ConditionZ. In an example, query migrator 122 constructs the search query by replacing all the constants in the conditions clause (e.g., Condition1, Condition2, . . . , ConditionZ) with a wild card (e.g., asterisks in SQL). The search query may then be used to query the query statistics database. It should be understood that a wild card (e.g., "*") may be used in the expressions clause, tables clause, or conditions clause.

In some embodiments, query migrator 122 constructs a CANDIDATES set and puts into this set all queries that have the same FROM clause as the search query (e.g., same number of tables and/or same table names). Query migrator 122 may remove those queries from the CANDIDATES set that have fewer columns in the SELECT clause than the search query and/or remove those queries from the CANDIDATES set that have a different number operators (e.g., "AND" and/or "OR" operators) in the WHERE clause.

Query migrator 122 may then select a query that has the greatest number of the same condition (e.g., Condition1, Condition2, . . . , ConditionZ) elements as the search query, where the selected query is from the CANDIDATES set. The resulting CANDIDATES set may then be referred to as a CLOSE set of queries that include the most similar queries to the failed query. In an example, query migrator 122 may update the CANDIDATES set by removing, based on a comparison of the one or more queries in the CANDIDATES set and the failed source query, one or more queries from the CANDIDATES set. The resulting set may be the CLOSE set.

Query migrator 122 may migrate the failed query based on at least one of the queries in the CLOSE set. In an example, query migrator 122 replaces the failed query with a query in the CLOSE set and sends this migrated query 408 back to data federation engine 124 for further processing (migrated query 408 in FIG. 4 may be the query that is sent at action 312 in FIG. 3). Query migrator 122 may replace the appropriate constants from the search query into the migrator query and may modify the SELECT clause to match the migrated query column set. It may happen that the migrator query includes more columns than the search query. In such a case the result may be returned to the client without errors.

When query migrator 122 migrates a query, query migrator 122 includes an indication that the query has been migrated. In an example, query migrator 122 may insert a migration comment into the query to indicate that it has been migrated. Query migrator 122 may insert a migration comment into queries to indicate that they have been migrated. Query migrator 122 migrates an initial query by modifying the query or using a different query (migrated query) in the place of the initial query. Query migrator 122 may also set a flag in a table in query statistics database 126 to indicate that the query has been migrated (not shown).

Data federation engine 124 may then receive this migrated query, send it to its target data source, and retrieve a result set. As discussed above, when an error occurs, data federation engine 124 notifies query migrator 122 which query failed and with what error. In this example, if the migrated query fails, query migrator 122 may again search for a closest similar query to the most recently failed query. For example, query migrator 122 may replace the most recently failed query with another one of the queries in the CLOSE set. If all of the queries in the CLOSE set fail, then the whole federated query that is submitted may be rendered unusable.

In another example, query migrator determines whether federated query 112 has failed. Query migrator 122 may migrate the federated query in response to determining that the federated query has failed. In an example, query migrator 122 migrates the federated query by replacing the failed source query that was embedded in the federated query with the migrated source query.

Accordingly, query migrator 122 may detect when a client (e.g., client 102) has issued a query in accordance with a data source's outdated query model and may rewrite this query such that it is in accordance with the data source's updated query model. Query migrator 122 uses queries submitted from clients and stores the statistics based on those queries in query statistics database 126 in order to detect when another client has sent a query in accordance with the data source's outdated query model.

2. Do Not Migrate Query Based on Result Set from Data Federation Engine

On the other hand, when all source queries embedded in federated query 112 successfully execute data federation engine 124 notifies query migrator 122 about the successful execution of all source queries embedded in federated query 112. Data federation engine 124 may place these notifications in complete result set 406 for query migrator 122 to review. Accordingly, query migrator 122 may store statistics on a query when it comes in from a client request and then again when the query has been processed by data federation engine 124 and it is known whether the query failed or was successfully executed.

3. Example Collected Information Based on a Query in Accordance with a Data Source's Outdated Query Model FIG. 5B provides an example of the information stored in tables 502 and 503 after the query has been processed by data federation engine 124, according to some embodiments. In response to query migrator 122 collecting statistics in response to client 102 sending federated query 112 to federated server 120 five times, query migrator 122 may store information about federated query 112 and its embedded source queries into tables 502 and 503.

As illustrated in table 502 in FIG. 5B, source query 204 has successfully executed five times and source query 202 and federated query 112 have failed five times. The last time source query 202 and federated query 112 failed was on 13 Jan. 2014. As indicated in table 503 in FIG. 5B, client 102 sent federated query 112 including embedded source queries 202 and 204 to federated server 120, the reason that source query 202 failed was because it had an invalid table name in the query, and the reason that federated query 112 failed was because source query 202 failed. In an example, data source 104 may have returned back an error with an indication of the reason for the error (e.g., invalid table name in source query 202).

C. Receive a Query in Accordance with a Data Source's Updated Query Model

In the example illustrated in FIG. 5B, source query 202 is in accordance with target data source 104's outdated query model and thus fails. Client 102 has not updated its source query 202 in accordance with data source 104's updated query model. Client 103, however, may receive updates about data source 104 and know that it has updated its query model. Accordingly, client 103 may update its source query 202 and send valid queries to federated server 120. As will be discussed in further detail below, client 103's updated source query that conforms with data source 104's updated query model may be used to migrate other queries.

Client 103 may send federated query 114 to federated server 120, and federated query 114 may include embedded source queries 580 and 204. Source query 580 corresponds to source query 202, where source query 580 may be in accordance with data source 104's updated query model, and source query 202 may be in accordance with data source 104's outdated query model. In an example, source query 202 may include a selection of data from the "People" table, but this table may have been renamed as "Employees" in data source 104. Client 103 may become aware of this update and replace the "People" table in source query 202 that client 103 sends to federated server 120 with the updated table name "Employees." Accordingly, client 103's query is in accordance with data source 104's updated query model and is in a valid format. It should be understood that a data source's query model may change in other ways aside from an outdated table name. For example, a table stored in the data source may be removed from the data source. In another example, columns of a table stored in the data source may be added or removed from the table. In another example, an administrator of a data source may decide to not allow clients to pull data from a particular table column or table stored in the data source and accordingly update the data source's query model.

Query migrator 122 may inspect each of federated query 114 and its embedded source queries as discussed above and store information about the queries received by the clients as well as the statistics of the queries after they have been processed by data federation engine 124 (see FIGS. 3 and 4). FIG. 5C provides an example of the information stored in tables 502 and 503 when source query 202 is in accordance with data source 104's updated query model, according to some embodiments. In the example illustrated in FIG. 3, client 103 sends federated query 114 to federated server 120 four times and federated query 114 successfully executes each of the four times. Data federation engine 124 may notify query migrator 122 about the successful execution of all source queries embedded in federated query 114.

As illustrated in FIG. 5C, federated query 114 includes source queries identified by SID "204" and "580," which may be referred to as source query 204 and source query 580, respectively. Query migrator 122 collects information in response to client 103 sending federated query 114 to federated server 120 four times and also in response to receiving the query results from data federation engine 124. Query migrator 122 may store information about inspected federated query 114 into a fourth entry 526 of table 502. Fourth entry 526 indicates that federated query 114 has a FID of "114," includes embedded source queries 204 and 580, has successfully executed four times, has not yet failed, and is being inspected for the fourth time. Additionally, query migrator 122 may store information about inspected source query 580 into a fifth entry 528 of table 502. Fifth entry 528 indicates that source query 580 has a SID of "580," has successfully executed four times, has not yet failed, and is being inspected for the fourth time. Additionally, query migrator 122 may supplement the information about inspected source query 204 in third entry 524 of table 502 by incrementing the "Total Successes" column 510 to nine and incrementing the "Inspection Count" column 516 to nine, which indicates that source query 204 is being inspected for the ninth time.

Query migrator 122 may also store information about inspected federated query 114 into a fourth entry 556 of table 503. Fourth entry 556 indicates that the query identified by FID "114" was sent by client 103, has successfully executed four times, and has not yet failed. Additionally, query migrator 122 may store information about inspected source query 580 into a fifth entry 558 of table 503. Fifth entry 558 indicates that the query identified by SID "580" was sent by client 103, has successfully executed four times, and has not yet failed. Additionally, query migrator 122 may store information about inspected source query 204 into a sixth entry 560 of table 503. Sixth entry 560 indicates that the query identified by SID "204" was sent by client 103, has successfully executed four times, and has not yet failed.

At a later point in time, client 102 may again submit federated query 112, which includes source query 202 that is in accordance with data source 104's outdated query model (failed due to an invalid table name). Query migrator 122 may intercept and inspect federated query 112 and its embedded source queries again as discussed in relation to FIG. 3. As illustrated in FIG. 5C, source query 202 has failed five times and the last date of failure was 13 Jan. 2014. Query migrator 122 may intercept and inspect federated query 112 and its embedded source queries again as discussed in relation to actions 302 and 306 in FIG. 3. At action 308, query migrator 122 may determine that source query 202 has failed within the migration time interval and may accordingly find the closest similar query to source query 202 and submit this as the migrated query at action 312, as discussed in the disclosure.

As discussed above and further emphasized here, FIGS. 1-4 and 5A-5C are merely examples, which should not unduly limit the scope of the claims. For example, it should be understood that one or more modules or components in FIG. 1 (e.g., query migrator 122 and data federation engine 124) may be combined with another module or component. It should also be understood that one or more modules or components in FIG. 1 may be separated into more than one module or component.

IV. Example Methods

Figure 6:
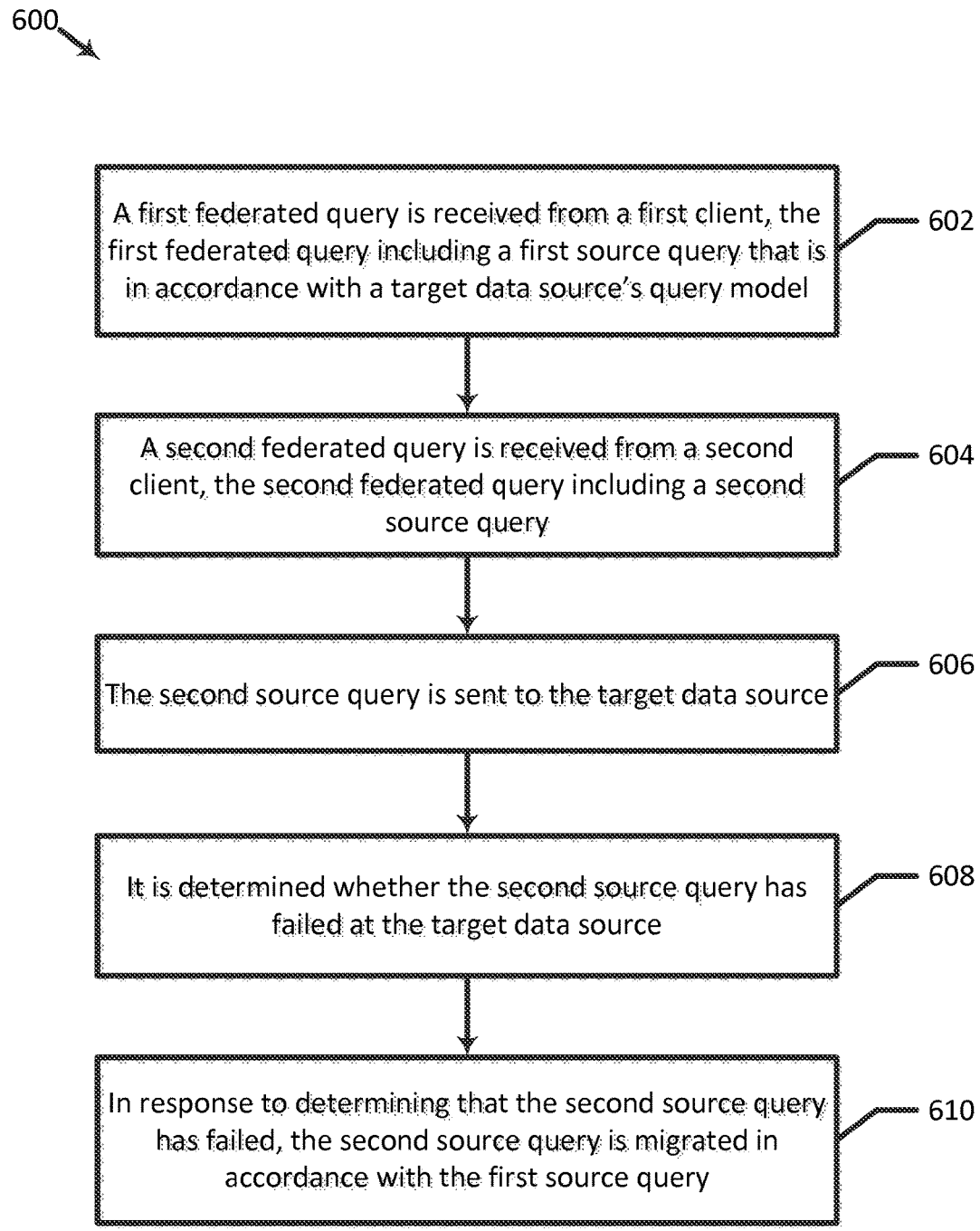
FIG. 6 is a flowchart illustrating a method of processing a federated query, according to some embodiments.

FIG. 6 is a flowchart illustrating a method 600 of processing a federated query, according to some embodiments. Method 600 is not meant to be limiting and may be used in other applications.

In FIG. 6, method 600 includes actions 602, 604, 606, 608, and 610. At an action 602, a first federated query is received from a first client, the first federated query including a first source query that is in accordance with a target data source's query model. In an example, query migrator 122 receives federated query 114 from client 103, federated query 114 including source query 380 that is in accordance with data source 104's query model. At an action 604, a second federated query is received from a second client, the second federated query including a second source query. In an example, query migrator 122 receives federated query 112 from client 102, federated query 112 including source query 202.

At an action 606, the second source query is sent to the target data source. In an example, query migrator 122 sends source query 202 to data source 104. At an action 608, it is determined whether the second source query has failed at the target data source. In an example, query migrator 122 determines whether source query 202 has failed at data source 104. At an action 610, in response to determining that the second source query has failed, the second source query is migrated in accordance with the first source query. In an example, in response to determining that the second source query has failed, query migrator 122 migrates source query 202 in accordance with source query 380.

In some embodiments, actions 602, 604, 606, 608, and 610 may be performed for any number of source queries embedded in a federated query or for any number of federated queries. It is also understood that additional processes may be inserted before, during, or after actions 602, 604, 606, 608, and 610 discussed above. It is also understood that one or more of the actions of method 600 described herein may be omitted, combined, or performed in a different sequence as desired.

V. Example Computing System

Figure 7:
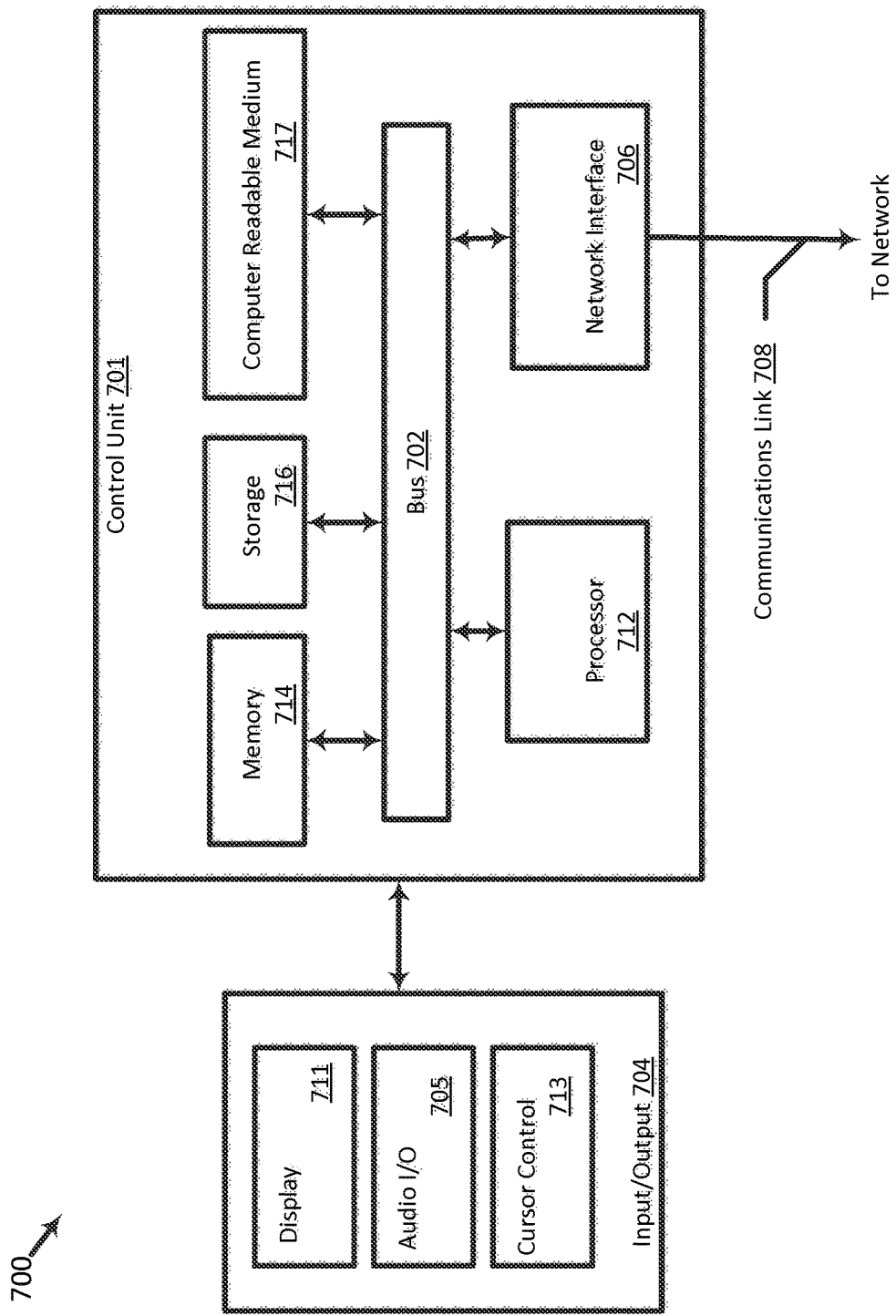
FIG. 7 is a block diagram of an electronic system suitable for implementing one or more embodiments of the present disclosure.

FIG. 7 is a block diagram of a computer system 700 suitable for implementing one or more embodiments of the present disclosure. Each of query migrator 122 and data federation engine 124 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 700 includes a bus 702 or other communication mechanism for communicating information data, signals, and information between various components of computer system 700. A processor 712, which may be a micro-controller, digital signal processor (DSP), or other processing component, processes these various signals, such as for display on computer system 700 or transmission to other devices via communication link 718. Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714.

Components include an input/output (I/O) component 704 that processes a user action, such as selecting keys from a keypad/keyboard, selecting one or more buttons or links, etc., and sends a corresponding signal to bus 702. I/O component 704 may also include an output component such as a display 711, and an input control such as a cursor control 713 (such as a keyboard, keypad, mouse, etc.). An optional audio input/output component 705 may also be included to allow a user to use voice for inputting information by converting audio signals into information signals. Audio I/O component 705 may allow the user to hear audio. A transceiver or network interface 706 transmits and receives signals between computer system 700 and other devices via a communication link 718 to a network. In an embodiment, the transmission is wireless, although other transmission mediums and methods may also be suitable.

Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 714, and transmission media includes coaxial cables, copper wire, and fiber optics, including wires that include bus 702. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 600) to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks or actions described herein may be changed, combined into composite blocks or actions, and/or separated into sub-blocks or sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a federated query, comprising:
receiving a first federated query from a first client, the first federated query including a first source query that is in accordance with a target data source's query model;
receiving a second federated query from a second client, the second federated query including a second source query, the first source query being different from the second source query, and the second source query including a conditions clause including zero or more condition elements;
sending the second source query to the target data source;
determining whether the second source query has failed at the target data source;
in response to determining that the second source query has failed:
constructing a search query by replacing one or more constants in the conditions clause of the second source query with a wild card;
constructing a set including one or more queries; and
updating the set by removing, based on a comparison of the search query and the one or more queries in the set, one or more queries from the set, wherein the first source query is in the set;
selecting the first source query from the updated set, the first source query having a greatest number of same condition elements in the conditions clause as the search query; and
sending the selected first source query to the target data source, wherein the second source query is replaced with the first source query.

2. The method of claim 1, wherein the first source query has successfully executed at the target data source, and wherein a query model of the second source query is different from the target data source's query model.

3. The method of claim 1, wherein the determining whether the second source query has failed includes determining whether the second source query has failed within a migration time interval.

4. The method of claim 1, wherein the second source query includes an expressions clause and one or more tables.

5. The method of claim 4, wherein each query in the set has the same number of tables as the search query.

6. The method of claim 5, wherein each query in the set includes the same table names as the search query.

7. The method of claim 5, wherein the updating includes removing one or more queries from the set having fewer columns in the expressions clause than the search query.

8. The method of claim 7, wherein the updating includes removing one or more queries from the set having a different number of operators in the conditions clause than the search query.

9. The method of claim 5, wherein constructing the search query includes replacing all constants in the conditions clause of the second source query with the wild card.

10. The method of claim 1, wherein the second federated query includes a third source query, the method further including:
sending the third source query to a second target data source different from the first target data source, wherein the second source query has failed at the first target data source, and the third source query has successfully executed at the second target data source.

11. A system for processing a federated query, comprising:
a query migrator that receives a first federated query from a first client and receives a second federated query from a second client, wherein the first federated query includes a first source query that is in accordance with a target data source's query model, the second federated query includes a second source query, and the second source query includes a conditions clause including zero or more condition elements; and
a memory that stores information about the second federated query, wherein the query migrator sends the second source query to the target data source and determines, based on the information, whether the second source query has failed at the target data source, wherein in response to determining that the second source query has failed, the query migrator constructs a search query by replacing one or more constants in the conditions clause of the second source query with a wild card, constructs a set including one or more queries, and updates the set by removing, based on a comparison of the search query and the one or more queries in the set, one or more queries from the set, wherein the first source query is in the set,
and wherein the query migrator selects the first source query from the updated set and sends the selected first source query to the target data source, wherein the first source query has a greatest number of same condition elements in the conditions clause as the search query, and the second source query is replaced with the first source query.

12. The system of claim 11, wherein the first source query has successfully executed at the target data source, and wherein a query model of the second source query is different from the target data source's query model.

13. The system of claim 11, wherein the second source query includes an expressions clause and one or more tables.

14. The system of claim 13, wherein each query in the set has the same number of tables as the search query.

15. The system of claim 14, wherein each query in the set includes the same table names as the search query.

16. The system of claim 14, wherein the query migrator removes one or more queries from the set having fewer columns in the expressions clause than the search query.

17. The system of claim 16, wherein the query migrator removes one or more queries from the set having a different number of operators in the conditions clause than the search query, and wherein an operator is an "AND" or "OR" operator.

18. A non-transitory machine-readable medium comprising a plurality of machine-readable instructions that when executed by one or more processors is adapted to cause the one or more processors to perform a method comprising:
   receiving a first federated query from a first client, the first federated query including a first source query that is in accordance with a target data source's query model;
   receiving a second federated query from a second client, the second federated query including a second source query, the first source query being different from the second source query, and the second source query including a conditions clause including zero or more condition elements;
   sending the second source query to the target data source;
   determining whether the second source query has failed at the target data source;
   in response to determining that the second source query has failed:
      constructing a search query by replacing one or more constants in the conditions clause of the second source query with a wild card;
      constructing a set including one or more queries; and
      updating the set by removing, based on a comparison of the search query and the one or more queries in the set, one or more queries from the set, wherein the first source query is in the set;
   selecting the first source query from the updated set, the first source query having a greatest number of same condition elements in the conditions clause as the search query; and
   sending the selected first source query to the target data source, wherein the second source query is replaced with the first source query.

19. The non-transitory machine-readable medium of claim 18, wherein the first source query has successfully executed at the target data source, and wherein a query model of the second source query is different from the target data source's query model.

* * * * *